May 19, 1931.  A. D. BOOTH  1,806,279
ROLLER BEARING
Filed Sept. 17, 1928

INVENTOR.
Augustus D. Booth.
BY
Edwin P. Corker
ATTORNEYS.

Patented May 19, 1931

1,806,279

UNITED STATES PATENT OFFICE

AUGUSTUS D. BOOTH, OF COLUMBUS, OHIO

ROLLER BEARING

Application filed September 17, 1928. Serial No. 306,506.

My invention relates to roller bearings. It has to do particularly with the provision of roller supporting rings and rollers of special form.

One of the objects of my invention is to provide a roller bearing structure of extreme simplicity which will, however, have ample rigidity for all normal uses.

Another object of my invention is the provision of roller supporting rings and rollers of such form that the rollers when in properly assembled position will operate without contacting with each other and, consequently, with a minimum amount of friction.

Still another object of my invention consists in the provision of rollers and supporting means of such relative form that the rollers will have end thrust support as well as a normal bearing support given by the rings which mainly carry them.

A further object of my invention is to provide roller supporting rings and rollers which make up a complete roller bearing in themselves. Such structure is adapted to reduce the cost of manufacture and assembly, facilitate shipment and reduce the cost of repairs to the bearings.

In its preferred embodiment, my roller bearing structure comprises a plurality of rollers having their ends tapered and having annular grooves adjacent each end thereof. In this form, these rollers are adapted to fit into spaced supporting rings, these rings being slotted on their outer peripheries for the reception of the necks produced by the annular grooves formed in the rollers. These slots have their entrance ends generally extending in a radial direction and they are then laterally turned and eventually communicate with circular notches which are partially separated therefrom by projecting points. The structure is such that the rollers, after being introduced radially into the slot are moved laterally until they pass with a snap action into the circular notches which conveniently retain them during the assembling operation. These circular notches are spaced apart to such an extent that the rollers are maintained out of contact with each other and at the proper distance from the center to fit in the housing and on the desired axle. The rollers are tapered upon their ends and are supported in end thrust bearings in addition to the support which they receive from the walls of the said notches.

The preferred embodiment of my invention is shown in the accompanying drawings wherein similar characters of reference designate corresponding parts and wherein.

Figure 1:
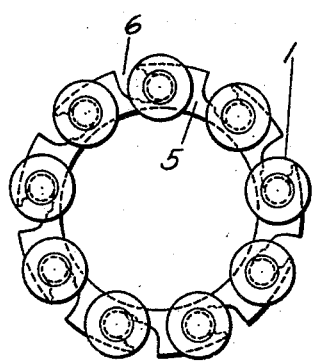
Figure 1 is an end elevation of my bearing structure.
Figure 2:
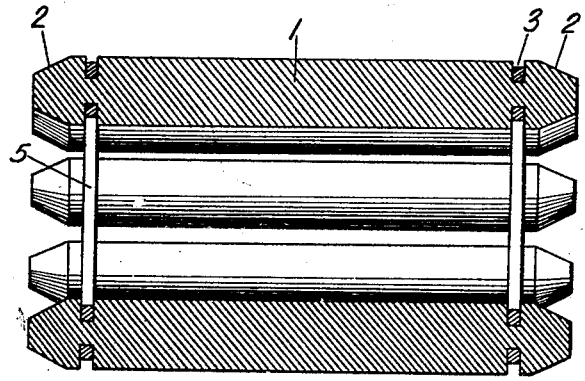
Figure 2 is a longitudinal section of the structure shown in Figure 1.

In the drawings, my bearing is shown as comprising a plurality of rollers 1 which are provided with tapered ends as at 2. These rollers are provided adjacent either end thereof with annular grooves 3, producing necks 4 which are designed to be supported within the ring structure constituting a part of my invention.

Figures 3, 4:
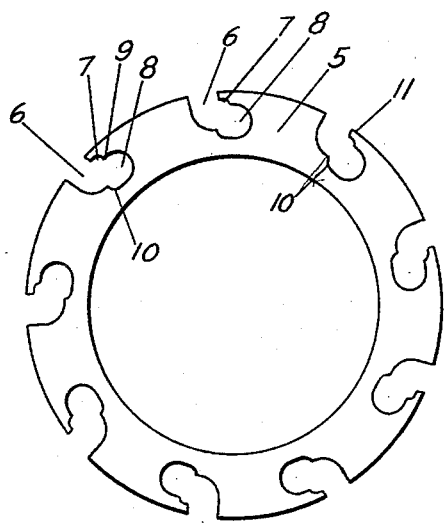
Figure 3 is a plan view of one of my supporting rings.
Figure 4 is a side elevation of the supporting rings shown in Figure 3.
Figure 5:
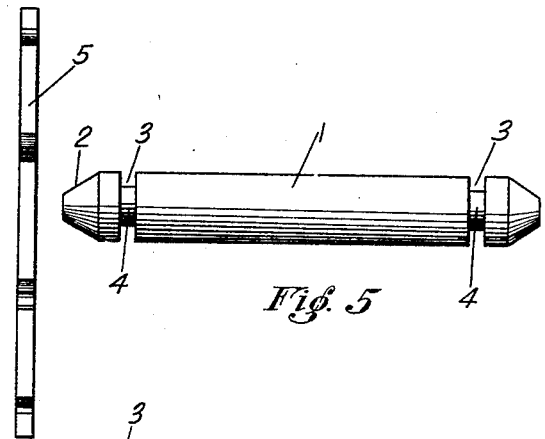
Figure 5 is a detail view of one of the rollers which I preferably utilize.
Figure 7:
Figure 7 is a view similar to Figure 5 but showing the ends of the rollers not tapered.
Figure 6:
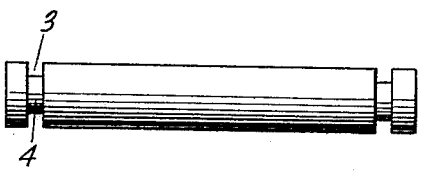
Figure 6 is a sectional detail illustrating the manner in which my rollers are mounted within a wheel structure.

Two or more rings may be provided. As shown best in Figures 3 and 4 each ring takes the form of a flat annular plate 5 having slots 6 which extend radially into the periphery thereof and which permit the ready entrance of the necks of the rollers thereinto. Each slot 6 penetrates the periphery of the ring for a short distance in a radial direction and then has a laterally extending portion 7.

Communicating with the laterally extending portion 7 of each slot 6 and forming the base thereof is a substantially circular notch 8. This notch 8, though not fully separated from the slot 6, is provided with contracted portions 9 and 10. These contracted portions or points 9 and 10 approach each other to such an extent that the necks 4 of the rollers may only pass between them by the application of pressure to the rollers. In other words, they may only be introduced into the notches or removed therefrom with what may be termed a snap action. Thus, when the rollers have their necks once seated within the notches 8, they are retained therein, although the notch structure is of such form that the tongues 11 are slightly resilient and permit the removal of the rollers with a small amount of pressure.

The bearing structure is further provided with end plates 12 which are of annular form and which are provided with angular flanges 13. These annular plates 12 preferably cooperate with inclined surfaces 14 on the axle and cap structure for giving an additional support in the nature of an end thrust support to the ends of the rollers.

It will be obvious that I have provided an extremely simple roller bearing structure wherein the rollers are maintained in spaced relation to each other and are therefore relieved from the friction which would result from contact with each other. These rollers are readily snapped into position and, when once in position, they are restrained against bodily movement. This structure forms a rigid cage which will hold the rollers in position independently of any other tying means. The rollers can thereby be assembled at the place of use without any other equipment. Furthermore, the rollers are supported both by the supporting rings which embrace and retain the necks thereof and by the supporting rings which constitute the end thrust bearing.

It will be apparent that the bearing structure described does not require tie pin or spacing rollers to hold the bearing together as a unit. The rings are of sufficient rigidity and the structure is such that there is formed a rigid unit which cannot be twisted out of alignment by any stresses to which it may be normally subjected. Furthermore, the rollers take the radial strain of the bearing and, also, they take the lateral strain or end thrust of both bearing members. A maximum roller surface is provided and, at the same time, my roller bearing may be taken apart or assembled. Obviously, the end members may be of cast metal or stamped metal, or other material if desired. My invention is also applicable to tapered rollers.

It will further be apparent that the bearing structure hereinbefore described is made up entirely of only end rings and rollers. Such construction will obviously reduce the cost of manufacture of the bearing principally because the bearings need not be assembled at the factory but may be sent to their destination with parts unassembled and put together as they are to be used. Also, while reducing the cost of manufacture, such construction will facilitate shipment of the bearings and it will be apparent that the cost of repairs to a bearing in use will be reduced due to the fact that if one or more rollers or end rings become defective, a new roller or end ring can be inserted as a part of the bearing without necessitating replacement of the entire bearing.

Having thus described my invention, what I claim is:

1. A roller bearing comprising a plurality of rollers having annular grooves formed therein, and flat rings having mortices or grooves for interfitting with such annular grooves, the mortices or grooves extending radially and then laterally into said rings and being of such structure that the rollers seat therein with a snap action.

2. A roller bearing comprising a plurality of rollers having annular grooves formed therein and having tapered ends, flat rings having mortices or grooves for interfitting with such annular grooves, substantially circular notches forming the bases for said mortices or grooves, each notch being partially separated from the rest of its groove by a contracted portion.

3. A roller bearing comprising a plurality of rollers having annular grooves formed therein and having tapered ends, flat rings having mortices or grooves for interfitting with such annular grooves, substantially circular notches forming the bases for said mortices or grooves, and yieldable points for separating said notches from the rest of said grooves.

4. In a roller bearing, the combination of a series of bearing rollers having peripheral grooves near their ends, an end ring for said rollers comprising a flat annular plate member having a plurality of mortices or grooves disposed about the outer periphery only, for the reception of said rollers, said mortices or grooves being undercut and adapted to receive said rollers and being so constructed that said rollers seat therein with a snap action.

5. In a roller bearing, the combination of a series of bearing rollers having peripheral grooves therein, a retaining ring for said rollers comprising an annular plate member, said plate member having a plurality of undercut mortices or grooves adapted to receive said rollers and constructed to maintain said rollers in spaced relation to each other.

6. In a roller bearing, the combination of a series of bearing rollers having peripheral grooves therein, a retaining ring for said rollers comprising an annular plate member, said plate member having a plurality of undercut mortices or grooves disposed about its periphery, said mortices being undercut in the same direction and being so constructed that said rollers will seat therein with a snap action.

7. A roller bearing comprising a flat end ring having slots which extend radially into the periphery thereof, and then extend laterally, said radially extending portion and said laterally extending portion being partially separated with contracted portions.

8. A roller bearing comprising a flat end ring having slots which extend radially thereinto, and then extend laterally, said radially extending portion and said laterally extending portion being partially separated with contracted portions.

In testimony whereof I hereby affix my signature.

AUGUSTUS D. BOOTH.